US012808223B2

(12) United States Patent
Smulders et al.

(10) Patent No.: US 12,808,223 B2
(45) Date of Patent: Nov. 24, 2026

(54) CREMATED REMAINS REMEMBRANCE SYSTEM, AND METHOD FOR ALLOWING PEOPLE TO REMEMBER CREMATED PERSONS OR ANIMALS

(71) Applicant: ATTENIUM I.P. B.V, ET Goirle (NL)

(72) Inventors: Koenraad Henricus Antonius Maria Smulders, ET Goirle (NL); Maykel Josephus Godefridus Maas, ET Goirle (NL); Sebastiaan Petrus Augustinus Maria Smulders, ET Goirle (NL)

(73) Assignee: Attenium I.P. B.V, Goirle (NL)

(*) Notice: Subject to any disclaimer, the term of this patent is extended or adjusted under 35 U.S.C. 154(b) by 274 days.

(21) Appl. No.: 18/839,836

(22) PCT Filed: Feb. 17, 2023

(86) PCT No.: PCT/NL2023/050078

§ 371 (c)(1),
(2) Date: Aug. 20, 2024

(87) PCT Pub. No.: WO2023/158309

PCT Pub. Date: Aug. 24, 2023

(65) Prior Publication Data

US 2025/0172010 A1 May 29, 2025

(30) Foreign Application Priority Data

Feb. 21, 2022 (NL) ..................................... 2031023

(51) Int. Cl.

*E04H 13/00* (2006.01)
*H04N 7/18* (2006.01)
*H04N 23/661* (2023.01)

(52) U.S. Cl.

CPC ........... *E04H 13/006* (2013.01); *H04N 7/183* (2013.01); *H04N 23/661* (2023.01)

(58) Field of Classification Search

CPC ... E04H 13/006; E04H 13/008; E04H 13/001; H04N 7/183; H04N 23/661; H04B 1/40; H04B 1/38

See application file for complete search history.

(56) References Cited

U.S. PATENT DOCUMENTS 7,621,575 B1 * 11/2009 Kellerman ............. A61G 21/00 296/18
8,292,163 B2 * 10/2012 Hershenhorn ......... G06Q 10/08 235/375

(Continued)

FOREIGN PATENT DOCUMENTS

JP 2001227201 A 8/2001
KR 20150136831 A * 12/2015 ............. G09F 27/00
KR 102163110 B1 * 10/2020 ............... G09F 9/30

OTHER PUBLICATIONS

Uriu, D., Odom, W. and Gould, H., Jun. 2018, Understanding automatic conveyor-belt columbaria: Emerging sites of interactive memorialization in Japan. In Proceedings of the 2018 Designing Interactive Systems Conference (pp. 747-752). (Year: 2018).*

(Continued)

*Primary Examiner* — Alicia M. Choi
(74) *Attorney, Agent, or Firm* — Maier & Maier, PLLC

(57) ABSTRACT

A cremated remains remembrance system and a housing for use in such a remembrance system. The embodiments further relate to a computer-implemented method for allowing people to remember cremated persons or animals, such as by using a remembrance system according to the embodiments.

19 Claims, 5 Drawing Sheets

(56) References Cited

U.S. PATENT DOCUMENTS

| | | | | |
|---|---|---|---|---|
| 2002/0062168 | A1 | 5/2002 | Richard | |
| 2008/0141508 | A1* | 6/2008 | Silva | H04N 7/18 27/1 |
| 2016/0378245 | A1* | 12/2016 | Montgomery | E04H 13/008 345/173 |
| 2017/0239122 | A1* | 8/2017 | McLaughlin | A61G 17/08 |
| 2019/0133863 | A1* | 5/2019 | Borovinov | A61G 17/00 |
| 2019/0194969 | A1* | 6/2019 | Shinnaka | A47G 33/02 |
| 2020/0089455 | A1 | 3/2020 | Green et al. | |
| 2022/0261100 | A1* | 8/2022 | Dreu | H04R 3/00 |

OTHER PUBLICATIONS

International Search Report issued on May 15, 2023, in corresponding International Application No. PCT/NL2023/050078, 2 pages.

* cited by examiner

CREMATED REMAINS REMEMBRANCE SYSTEM, AND METHOD FOR ALLOWING PEOPLE TO REMEMBER CREMATED PERSONS OR ANIMALS

TECHNICAL FIELD

The invention relates to a cremated remains remembrance system. The invention also relates to a housing for use in such a remembrance system. The invention further relates to a computer-implemented method for allowing people to remember cremated persons or animals, in particular by using a remembrance system according to the invention.

BACKGROUND

As a tradition dating back thousands of years, memorialization allows relatives, friends and other survivors to honour their deceased loved ones, preserve a family's heritage, and create a bond between generations. With increased concern for health conditions around cemeteries and the ever-increasing costs of earth burials, cremation has become an increasingly popular alternative for the memorialization of the deceased. As a result of the continually increasing costs, decreasing burial space, and ongoing health concerns, a number of countries and states now mandate cremation as the only option for the memorialization of the deceased.

Cremation presents many options for relatives and friends of the deceased. Urns may be placed in a columbarium niche which provides a recessed portion in a wall designed to contain urns. Memorial parks offer designated space for the internment of cremated remains. Most cemeteries also offer patrons the option of space specifically designed for the internment of cremated remains. Many cemeteries will also allow cremated remains to be memorialized in pre-purchased family plots. Other families choose to scatter the ashes of their deceased loved one. Still others opt to remember their loved one by displaying a memorial containing cremated ashes in their homes.

SUMMARY

Although many options exist for creating a unique tribute to the deceased, a strong need exists for further personalised and more efficient memorialization systems to contain cremated remains.

It is a first object of the invention to provide an improved cremated remains remembrance system.

It is a second object of the invention to provide a cremated remains remembrance system which allows a more personal remembrance of deceased persons or animals.

It is a third object of the invention to provide a more efficient cremated remains remembrance system.

At least one of these objects can be achieved by providing a (cremated) remains remembrance system comprising:

- a mobile housing for accommodating and presenting an urn in which cremated remains are placed and/or any other, typically box-like receptacle for a human or animal corpse, such as a coffin or sarcophagus, wherein said housing comprises:
  - a bottom wall onto which said urn and/or other said receptacle may be placed,
  - at least one side wall, wherein housing, in particular the side wall, allows the urn and/or other said receptacle, once placed or positioned onto the bottom wall, to be visible for persons, in particular relatives and friends,
  - at least one digital camera attached to the housing and pointed towards at least part of the urn and/or other said receptacle, once placed or positioned onto the bottom wall of said housing,
  - a communication unit configured to transmit images, in particular video, recorded by said digital camera, and
  - preferably at least one rechargeable battery for powering said display, said camera, and said communication unit; and
- at least one user computing device, such as a smartphone or tablet, configured to exchange digital information with said housing.

This exchange of digital information typically relates to, preferably wirelessly, receiving, via the communication unit, the images and/or videos as captured by the digital camera, and preferably to display said received images and/or video, onto said user computing device and/or another computing device. Preferably, the system comprises at least one digital display attached to the housing for displaying media, such as pictures and videos, preferably media of choice, wherein the camera is preferably also pointed or pointable to said digital display and wherein the system preferably also comprises at least one media player connected or connectable to said display. The display and/or media player can be controlled preferably via the communication unit. Preferably, the system also comprises at least one conveyor device configured to displace the mobile housing between at least one storage location for storing the housing, and at least one display location for exposing the housing, in particular the urn, to a predefined viewpoint. In the text cited below, reference is predominantly made to an urn. However, instead of or in addition to an urn also one or more other, typically box-like, receptacles for a human or animal corpse, such as a coffin or sarcophagus, may be used in the system, housing, and method according to the invention.

The remembrance system according to the invention is configured to distantly, preferably wirelessly, control the housing by using a user computing device, such as smartphone, tablet or PC. This distant control creates improved possibilities for relatives, friends, and other interested people to remember a deceased person or animal. More in particular, by using the system according to the invention, people having access to the digital camera are able to watch the urn, at any time and from any place in the world. The experience can be improved by displaying on the display, preferably a flatscreen, one or more images and/or videos, typically by using a media player. The media player could make integral part of the display. However, it is also possible that the media player constitutes a separate component which is connected or connectable to the display. This not only makes it possible to show a preferred image or video on the screen, which could give relatives, family, and other people, having access to the control of the housing, that this could please the deceased person or animal contained by the urn. The remembrance experience could further be improved by allowing people to view through the digital camera both (a part of) the urn and the display, which could give the feeling that people are watching together with the deceased person or animal the image or video displayed on the screen. This visual remembrance experience could further be improved for displacing the housing with the urn from a storage location to a display location. At the display location the urn is visually exposed to a view which could please the deceased person or animal, such as a reception area for family and relatives, and/or a building's windows having an attractive view outside. This displacement is realized by using the conveyor device, which could be a simple conveyor or more complicated conveyor device. The additional advantage of this displacement is that a plurality of housings with (or without) urns could be stored, and even relatively densely packed side-by-side in a 2D or 3D arrangement, in the system according to the invention. This increases the housing and urn storage capacity of the system according to the invention while preserving the improved remembrance advantage of exposing the urn at the display location.

Typically, a housing is configured to contain a single urn. However, it is also conceivable that a housing contains a plurality of urns. This latter could be preferred in case the plurality of urns contained by said housing contains cremated remains of deceased relatives or friends.

It is additionally imaginable that the housing comprises at least one speaker configured to produce sound based upon a corresponding electrical audio signal. This allows the housing to display images or videos with sound. The at least one speaker could make part of the display. Optionally, the housing comprises at least one speaker instead of said digital display, which allows to play sound, in particular music and/or speech within the housing without visual images. Optionally, the housing comprises at least one microphone which could be integrated in the digital camera. The microphone is able register and record sound which can be transmitted via the communication unit to a user computing device.

The housing can have various shapes, and is preferably substantially prism shaped or substantially cylindrically shaped. In case of a substantially prism shaped housing, the housing is a polyhedron with a n-sided polygon bottom wall, wherein $n \geq 3$. Preferably, the housing is substantially cube shaped. Such a shape is not only attractive from an aesthetical point of view, but also allows an efficient dense packing (storage) of housings in a side-by-side arrangement. Preferably, the housing is a modular housing, wherein the side walls are releasably (dismountably) attached to each other. This facilitates economic transportation of the housing prior to installation.

In a preferred embodiment, at least one side wall of the housing encloses at least one opening, wherein said digital camera is also pointed or pointable towards said opening. Said opening could also be enclosed by two side walls of the housing.

The opening could be could by an at least partially transparent and/or translucent side wall of the housing, such as a glass plate or transparent polymer plate. This transparent side wall acts as window through which visitors are allowed to see the urn, and through which the urn is exposed to surroundings of the housing. In a particular preferred embodiment, the at least one side wall of the housing is at least partially composed of transparent electrochromic glass capable of varying its light transmission values throughout its surface area in response to the application of an electric field, and wherein the system comprises at least one generator for generating an electric field. Visitors allowed to control the housing could be allowed to distantly adjust the transparency of said electrochromic glass.

The length, the width and height of the housing are preferably equal to or less than 60 centimetre, more preferably equal to or less than 50 centimetre, and most preferably approximately equal to 40 centimetre.

Preferably in each housing, the camera and the display are situated at opposing sides (or opposing side walls) of the housing, and preferably physically attached to opposing side walls of the housing. In this way, the display and the camera mutually enclose the urn, which allows the camera to capture images of both the urn and the display.

Preferably, the camera is attached to an upper section of the side wall, wherein the camera is preferably attached at a camera height which is at least 75% of the inner height of the housing. Preferably, a centreline of the camera is positioned at a higher level than a centreline of the display. Preferably, the display is at least partially attached to an upper section of the side wall, wherein a centreline of the display is preferably attached at a display height which is at least 60% of the inner height of the housing.

In a preferred embodiment, the housing comprises at least one connector for electrically connecting the housing to at least one charging station and/or an external controller. This allows the one or more rechargeable batteries of the housing to be recharged within the system. Optionally, the charging station can be configured to wirelessly charge the battery or batteries of the housing. The location of the charging station can be situated at a distance from the storage location and display location, but may also coincide with one of these locations. The external controller may for example be a central controller (CPU), which may be programmed to act as digital gateway between the user computing device(s) and the housing(s), and to allow users to control one or more (selective) housings. Furthermore, the external controller may be used to receive images and/or videos as captured or recorded by the camera, preferably via a wired connection (via said connector), for further processing, in particular for transmitting these images and/or videos, in wired or wireless manner, to a receiving device, such as a user computing device. Typically, the housing also comprises at least one internal controller for controlling at least the at least one camera, the at least one display, and the communication unit. The internal controller and/or external controller may be configured to authenticate users attempting to control a housing, wherein such control right to control a specific housing is only granted after authenticating of said user and/or the user computing device used by said user. This prevents unauthorized persons to control housings, wherein the control of a specific housing is only allowed to authorized persons.

Preferably, the bottom wall of the housing comprises at least one mounting element for mounting the urn. This mounting element could be of various nature, and may e.g. be formed by a screw or pin, or pair or screws and pins, or any other locking or securing element. Such a mounting element stabilizes the urn during transportation within the system. Moreover, the mounting element(s) could be configured to act as anti-theft mounting element(s) to prevent the urn to be stolen from the housing.

The communication unit typically comprises at least one antenna, such as a BLUETOOTH® antenna and/or a Wi-Fi® antenna and/or a cellular antenna, such as a 3G, 4G, or 5G antenna. These antennas allow wireless communication, directly or indirectly, with a user computing device.

Preferably, the conveyor device comprises at least one shuttle and at least one runway, preferably a plurality of runways, for said at least one shuttle, for displacing the housing between a storage location and a display location. In case a plurality of runways is used these runways may be interconnected, such that a shuttle may run over a plurality of runways. Each runway may for example comprises two rails or one or more racks for guiding the shuttle and for transporting the shuttle between a storage location and a display location, and optionally a recharge location. Typically, the shuttle comprises a chassis provided with running wheels adapted to travel along the runway, wherein said chassis is provided with a housing-carrying area, such as a tray. Alternative shuttle constructions may also be conceivable. Preferably, the shuttle comprises at least one extendable arm, preferably at least one pair of extendable arms, mounted to said chassis in order to transfer an article between a storage location and said housing-carrying area. Preferably, at least a part of a transportation direction of at least one runway extends in vertical direction, wherein said vertical runway is preferably configured as elevator, and/or at least a part of a transportation direction of at least one runway extends in horizontal direction. In a preferred embodiment, the system comprises a plurality of said housings, and wherein the system comprises a warehouse which comprises at least one storage level for storing said housings, preferably a plurality of superposed storage levels, wherein each storage level comprises at least two storage locations. Such a warehouse allows a plurality of housings to be stored, moved, and used in a relatively efficient way. In this embodiment, the system according to the invention actually acts as dynamic columbarium and/or as interactive columbarium. The shuttle or another component of the conveyor device may be configured to rotate the housing around a vertical axis to change the orientation of the housing with respect to the environment. In this manner, the housing can be rotated over an angle of choice, which is typically 90, and/or 180, and/or 270, degrees. This facilitates directing an open and/or transparent side wall of the housing to be positioned in a preferred direction, such as towards a window. Preferably, at least one media player is installed on a host computing device configured to communicate with the communication unit of each housing. This host computing device may be part of the system or may be an external host computing device, for example hosted or controlled by subscription streaming service and/or production company. Preferably, at least one media player is provided with and/or connectable to a library of pre-installed videos. This allows relatives and friends having digital access to the housing to select a video from said library to be displayed on the display of the housing.

Additionally or alternatively to the above embodiment(s), it may be preferred that the conveyor device comprises at least one belt conveyor and/or at least one roller conveyor, preferably a powered roller conveyor. Said belt conveyor typically comprises at least one endless conveyor belt which co-acts with and/or rests against at least two pulleys, of which at least one pulley is designed as a driven pulley. Preferably, the driven pulley is for this purpose in operative connection with a drive motor, such an electromotor. Said roller conveyer typically comprises a plurality of axially rotatable rollers, which are preferably rotatably mounted onto a support structure, such as a frame. Optionally, one or more of said rollers may be driven and/or powered rollers, wherein said driven and/or powered rollers are connected, directly or indirectly, to a drive motor, such as an electromotor. Optionally, one or more of said rollers may be freely rotatable rollers, which are undriven gravity rollers. The rollers preferably have a substantially cylindrical shape.

Additionally or alternatively to the above embodiment(s), it may be preferred that the conveyor device comprises at least one transfer robot, such as a carrying robot. Preferably, the transfer robot is a mobile transfer robot which can be displaced (moved) over a floor. To this end, the transfer preferably comprises at least one wheel, wherein at least one wheel is preferably a motor-driven wheel. At least one wheel, such as the motor-driven wheel, may be a castor wheel. Preferably, the transfer robot comprises at least one control unit to drive the robot, in particular to drive at least one motor-driven wheel. In this manner, the speed and/or direction of the transfer robot can be adjusted. Preferably, the transfer robot comprises a picking mechanism for picking and/or placing at least one housing. The picking mechanism preferably comprises a body slidably connected to a gantry and a pair of clamping forks slidably connected to the body, wherein said clamping forks are configured to clamp (pick) a housing. Preferably, the transfer robot comprises a lifting device to vertically displace a housing to transfer said housing between different locations, in particular a storage location, such as a storage shelf and/or a, preferably multi-level, storage rack, and another location, such as the display location. Preferably, this lifting device of said transfer robot comprises a telescopic fork provided with picking mechanism for picking and/or placing at least one housing, wherein said telescopic fork and/or said picking mechanism can move in upward and downward direction. Optionally, said telescopic fork and/or said picking mechanism is configured to co-act with a mast mounted onto the transfer robot. Preferably, the transfer robot comprises a drive motor, such as an electromotor, to drive the telescopic fork and/or the picking mechanism. The transfer robot may be configured to be displaced over a runway, such as a track or rails. However, it is also imaginable that the transfer robot is freely moveable over a floor without needing such a runway. The robot is preferably provided with at least one rechargeable battery to allow wireless operation of the robot.

Preferably, a control application is installed on or accessible by the user computing device, which control application is configured to communicate, directly or indirectly, with the communication unit of a selective housing, and wherein the control application is configured (i) to allow a user of the user computing device to control at least one media player to display a selective video on the display of said selective housing, and (ii) to display an image and/or video recorded by the camera of said selective housing onto a screen of said user computing device. Typically, the user computing device needs to be connected to the internet in order to make contact with a housing to control said housing. The control application can e.g. be native software, such as a native app, installed onto said user computing device and/or can be software which is accessible via a (secured) web page using the internet.

The invention also relates to a housing for use in a system according to the invention.

The invention further relates to a computer-implemented method for allowing people to remember deceased, in particular cremated, persons or animals, in particular by using a system according to the invention, comprising the steps of:

A) allowing a user, by using a user computing device, such as a smartphone or tablet, to:
   i. digitally control, preferred in a wireless manner, a media player of a housing containing an urn, in which cremated remains are placed, and/or any other, typically box-like receptacle for a human or animal corpse, such as a coffin or sarcophagus, to display media, such as pictures and videos, onto a digital display of said housing facing said urn and/or said other receptacle, and to display an image recorded by a digital camera of said housing facing said urn and/or said other receptacle and said digital display onto a screen of said user, in particular a screen of said user computing device; and/or
   ii. wirelessly digitally control a conveyor device to transport said housing between a storage location and a display location, and to display an image recorded by said digital camera of said housing facing said urn and/or said other receptacle and an opening enclosed by at least one side wall of said housing onto a screen of said user, in particular a screen of said user computing device.

Preferably, the method also comprises step B), which is performed prior to step A), consisting of enrolling and/or authenticating the user and/or the user's user computing device to control at least one selective housing, and in case this enrolment and/or authentication is successful, to grant said user and/or said user computing device the digital right to, preferably wirelessly, digitally control said at least one selective housing during step A). Preferably, during or prior to step B) a user profile is initially created wherein the digital user access rights are stored indicating information relating to at least one selective housing which can be controlled by the user during step A) (the permissions), and optionally indicating information relating to at least one other housing which cannot be controlled by the user during step A) (the restrictions). It could be preferred that in the user profile user payment information is stored, which allows the user to make use of paid services and/or to make payment transactions prior or during step A). Preferably, the method comprises step C) consisting of charging the user, by using the payment information stored in the user profile, based upon at least one predefined usage criterion and/or user criterion relating to step A). For example, a user may be charged for subscription to the system, for example on daily, weekly, monthly, or yearly basis to allow the user to make use of the system according to the invention, and/or a user may for example be charged to stream one or more selected media to the display of a selective housing.

Preferably, the method comprises step D), which is performed prior to and/or during step A), consisting of selecting by said user, and by using the user computing device, at least one image and/or at least one video, preferably chosen from a media library, and to be displayed on the digital display of the housing during step A). As indicated above, these media could be stored in a media library present on the user computing device and/or offered by a third party, such as an external streaming service, and/or offered by a host company responsible for handling the system.

It is imaginable that the camera position is adjusted by the user during step A). This camera position adjustment could e.g. relate to tilting the camera, and/or panning the camera, and/or (un)zooming the camera.

BRIEF DESCRIPTION OF THE DRAWINGS

The invention will be further elucidated by examples of preferred, non-limitative embodiments of the invention which are shown in the appended figures, wherein.

DETAILED DESCRIPTION OF THE EMBODIMENTS

Figure 1:
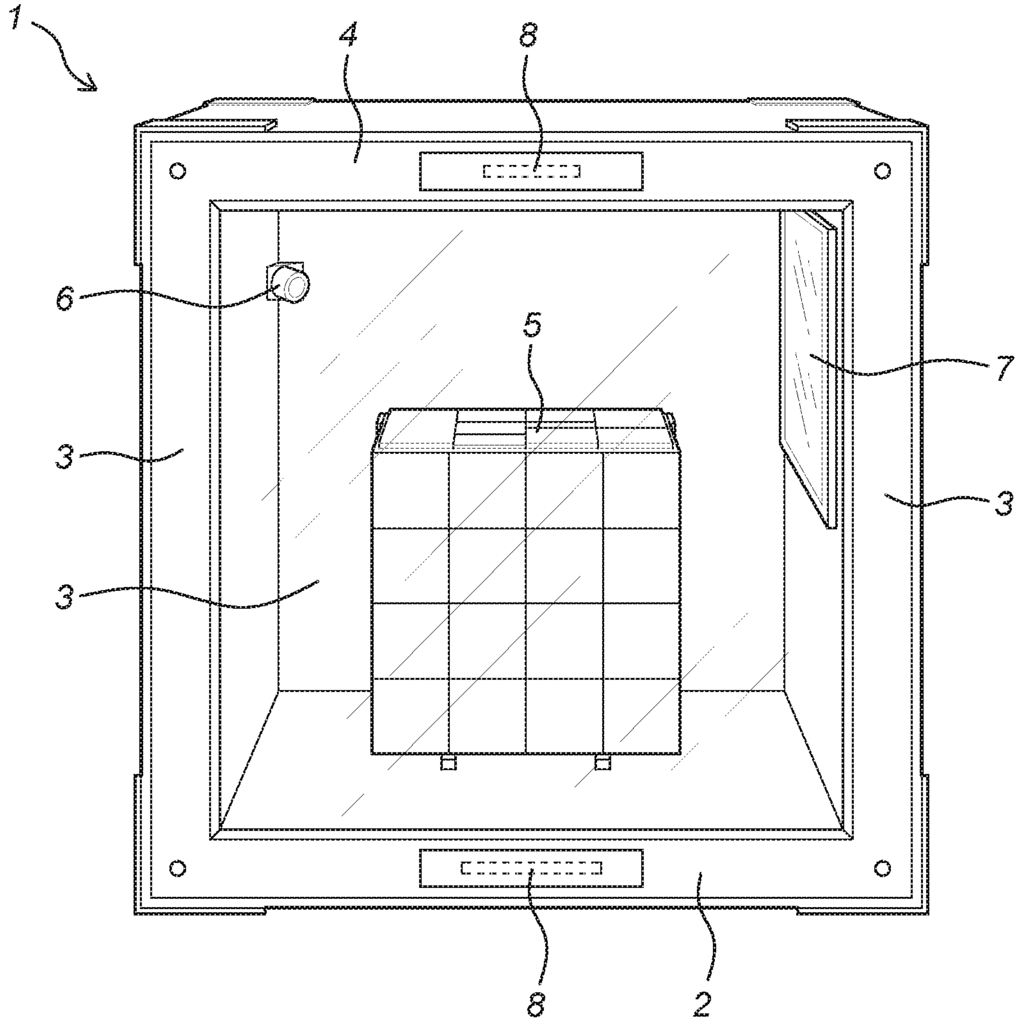
FIG. 1 shows a perspective view of a housing for use in a system according to the invention.
Figure 2:
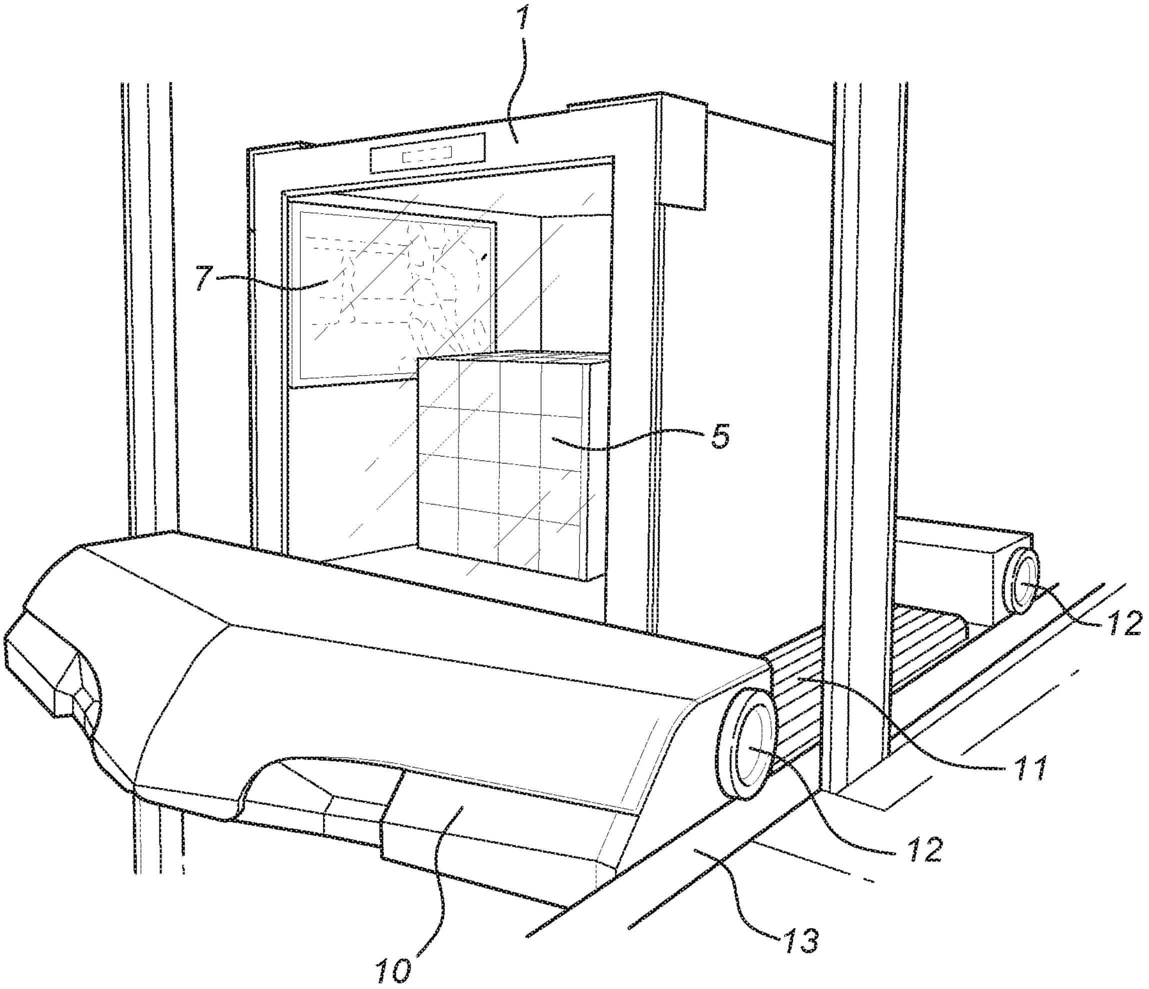
FIG. 2 shows a perspective view of a similar housing as shown in FIG. 1, placed on a shuttle, and positioned at the display location as used in a system according to the invention.
Figure 3:
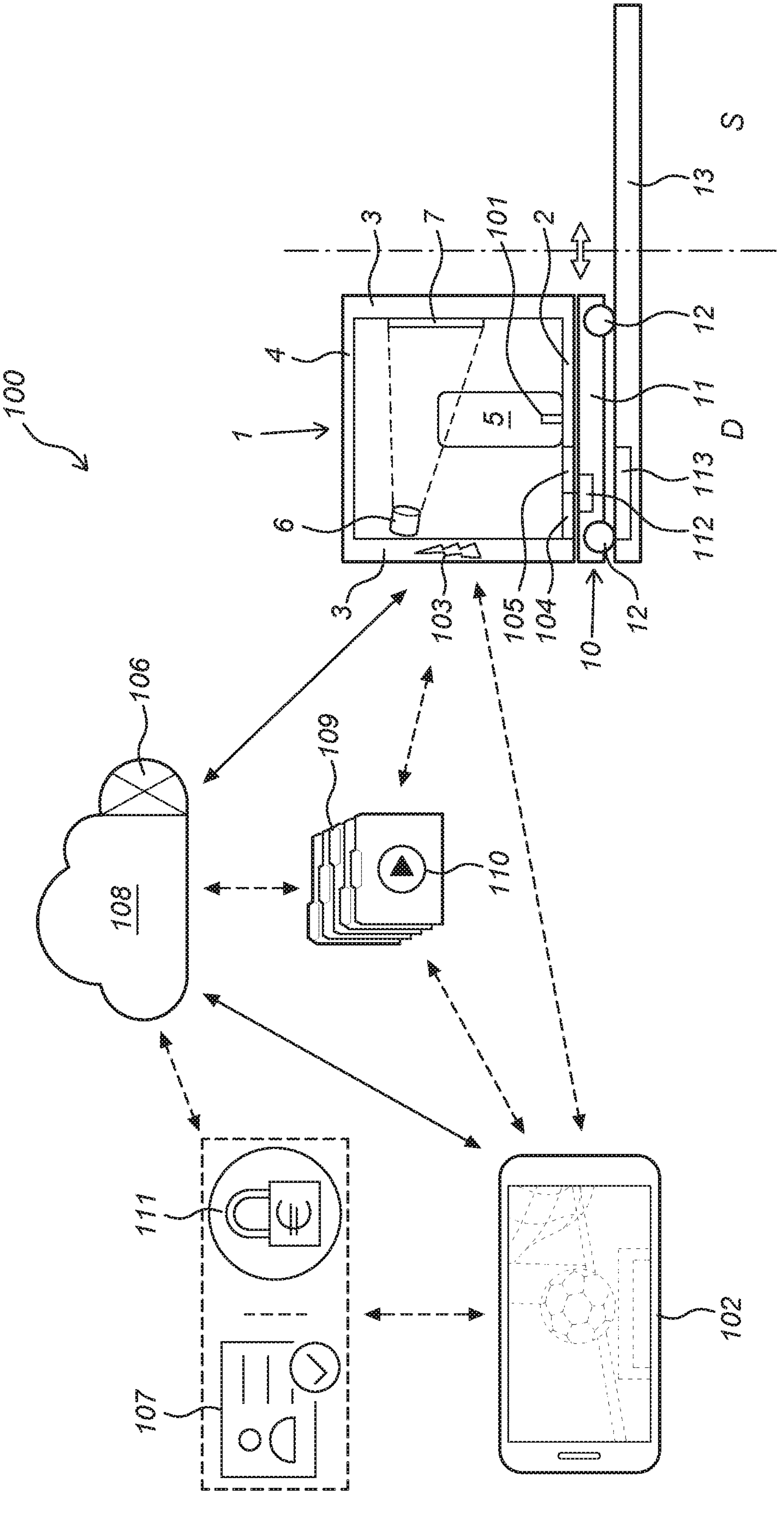
FIG. 3 shows a schematic view of a system according to the invention, wherein use is made of the housing and the shuttle according to FIG. 2.

FIG. 1 shows a perspective view of a housing 1 for use in a system 100 according to the invention and as shown in FIG. 3. The housing 1 is a mobile housing, which means in this context that it can be moved between different locations, in particular a storage location and a display location. The display location in shown in more detail in FIG. 2. The housing 1 may be lifted and/or carried by a person, and hence may be portable. Optionally, the housing 1 is provided with one or more handgrips to facilitate carrying the housing 1. In this example, the housing 1 is a modular housing, which comprises a bottom wall 2, four side walls 3, and a top wall 4, which walls 2, 3, 4, are mutually connected by means of e.g. fastening elements, such as screw and/or pins. The front side wall 3 is transparent. The height, the width, and the depth of the housing 1 equals to 40 centimetre in this example, which makes the housing 1 cube-shaped. Onto the bottom wall 2 an urn 5 in which cremated remains are placed, which are typically remains of a person and/or animal, in particular a pet. The urn 5 is fixedly attached to the bottom wall 2, e.g. by means of one or more screws 101, schematically shown in FIG. 3. A front edge of the housing 1 onto which the transparent front side wall 3, such as a transparent glass plate or transparent polymer plate, is attached can be provided with information 8 relating e.g. to the cremated remains accommodated in the urn 5. A left-handed side wall 3 is provided with a digital camera 6, which may be a robotic camera which can be tilted and/or panned. The camera 6 is located near the top wall 4. The camera 6 is preferably positioned at a height of at least 75% of the total inner height of the housing 1. A right-handed side wall 3 is provided with a digital display 7, in particular a flatscreen, for display an image and/or video of choice, typically of choice by relatives and friends. The centreline of the display 7 is preferably positioned at a height of at least 60% of the total inner height of the housing 1. The camera 6 is pointed towards the urn 5 and the display 7, such that an image (or video) can be recorded (or captured) of both the (top of the) urn an image or video of choice displayed on the display 7. This leads to a living memory experience, wherein relatives and friends of a deceased person or animal are allowed to keep this person or animal relatively close with them, which allows them to remember this person or animal in an improved manner. The housing 1 comprises more technical features than described above, which will be explained in more detail in the description of FIG. 3.

FIG. 2 shows a perspective view of a similar housing 1 as shown in FIG. 1, placed on a shuttle 10, and positioned at the display location as used in a system according to the invention. For sake of displaying alternative embodiments, the camera 6 (not shown) and the display 7 are swapped. Hence, the display 7 as shown in FIG. 2 is attached the left-handed side wall 3. This does obviously not affect the functionality and further technical features of the housing 1. The housing 1 can be placed loosely onto a tray 11—acting as housing-carrying area—of the shuttle 10, but may also be, preferably releasably, fixed to the shuttle 10, for example by means of clamping, gripping, mechanically locking, and/or by magnetic forces. The shuttle 10 comprises wheels 12 to allow the shuttle to run over a runway 13 to displace the shuttle 10, and hence the housing 1, between at least one storage location, at least one display location (as shown), and optionally at least one recharge location. A display location may be a location where relatives and friends are able to physically approach the housing 1 and the urn 5 to allowing them to directly see the urn 5 and an image or video displayed on the display 7 (if switched on). Hence, in a preferred embodiment the display location makes part of a reception area where relatives and friends could have a meet and greet with a deceased cremated being contained by the urn 5. After a visit of relatives and/or friends to the urn 5, located at the display location, the shuttle 10 will normally remove the housing 1 with the urn 5 from the display location to an alternative location, such as a storage location. This allows other housings 1 with other urns 5 to be moved to the (same) display location as well allowing (other) relatives and/or friends to spend time with other deceased persons or animals. Hence, preferably a plurality of housings is used in the system 100 according to the invention, wherein each of a plurality of housings is provided with a urn. The display location may also be a location close to a building's window with a view, which exposes the urn 5 to said view, and which allows people having digital wireless access, via a user computing device 102 (see FIG. 3), such as a smartphone or tablet, to the camera to see the urn 5 and the view, and preferably the display 7, as well. Hence, this will lead to a digital meet and greet with a deceased person or animal rather than a physical meet and greet.

FIG. 3 shows a schematic view of a system 100 according to the invention, wherein use is made of the housing 1 and the shuttle 10 according to FIG. 2. As mentioned above, the shuttle 10 is configured to displace the housing 1 provided with the urn 5 between at least one display location (D) and at least one storage location (S). In this figure, it is shown that the housing 1 comprises more features than the features already addressed above. The housing 1 also comprises a communication unit 103 which may be accommodated within or attached to at least one wall 2, 3, 4 of the housing 1. The housing 1 also comprises at least one internal controller 104 which is connected to the communication unit 103, the camera 6 and the display 7 of the housing. Furthermore, the housing comprises at least one rechargeable battery 105 for powering the electronic equipment 6, 7, 103, 104. The communication unit 103 typically comprises at least antenna, which may e.g. be a BLUETOOTH® antenna and/or Wi-Fi® antenna and/or a cellular network antenna, such as a 3G, 4G or 5G antenna. The communication unit 103 is typically configured to be connected to a nearby BLUETOOTH® device, which may be the user computer device 102 (see dashed arrow). The communication unit 103 is typically also configure to wirelessly communication with a central controller or external controller 106 of the system, which may be part of a local area network (LAN) and/or a wide area network (WAN) intended to allow a user to control the housing 1 via the user computing device 102, which is wirelessly connected via (at least) the central controller 106 and the local controller 104 to the housing 1 to control said housing 1. Prior to (first) use, it is typically preferred that the user and/or the user computing device 102 to be used is enrolled and/or authenticated to allow—id est to grant rights to—said user to control one or more selective housings 1. Optionally, an identification module 107 is used to verify and store the identity of the user and/or the user computing device 102, and to subsequently check the identity of the user and/or the user computing device 102 prior to being allowed to control the housing 1. Typically, a user profile is initially created and stored on an online (cloud) platform 108 running on at least one host computing device to periodically perform an identity check in case a user and/or user computing device intends to connect to a specific housing 1. This user profile and the identity check may require to upload information relating to one or more user specific biometric characteristics. The user computing device 102 could be provided with native software, such as an app, to control the housing 1 and/or to control the media to be displayed on the display 7. Alternatively, the user computing device 102 could open a specific web page to be able to control the housing 1 and/or to control the media to be displayed on the display 7. Preferably, said software and website make use of a secured login to prevent fraud and to prevent malicious persons to allow control of the housing 1 and the system 1 as such.

As seen in the schematic drawing of FIG. 3, the camera 6 is pointed towards and registers both the display 7 and a top section of the urn 5. Typically, the camera 6 is also pointed towards the transparent front side wall 3 of the housing 1 and/or is configured to be pointed to said front side wall 3 by panning, tilting, and/or (un)zooming said camera. What is (to be) displayed on the display 7 can be of an image or video of different origins. It is for example imaginable that a deceased person which remains are enclosed by the urn 5 have preselected one or more favourite images or videos before passing away. This selection of images and/or videos may be stored in a media library 109 which is connected to a media player 110, and which media player 110 is connected, directed or indirectly, to the display 7. It is also imaginable that the media library 109 and media player 110 make part of an online streaming service, which may include live television. The user holding the user computing device 102 may select one or more images or videos to be displayed on the display 7 using said online streaming service. It is also imaginable that one or images and/or videos are stored on the user computing device 102 which can be wirelessly casted from said device 102 to the display 6 of the housing 1. Optionally, the system 100 may comprises a payment module 111 or payment gateway which allows the system to offer paid services to the user, wherein the user can be charged based upon one or more predefined criteria, which can be a subscription pricing model, which can e.g. be a time-based pricing model (based upon daily, weekly, monthly or annual subscription), and/or data-driven (based upon the amount of data transferred to a specific housing). At the storage location (S) the housing 1 may be discharged from the shuttle 10, which allows the shuttle to subsequently carry one or more other housings. Although typically less preferred embodiment from an economic point of view, but nevertheless possible, the shuttle 10 with the housing 1 mounted thereon may be stored as assembly at the storage location, which requires that each housing 1 will be stored (permanently) on its own shuttle 10. Typically, each shuttle 10 comprises a shuttle controller 112 to control and move the shuttle 10, in particular the control an engine, typically an electromotor, to drive the wheels 12 in a desired direction. Typically, the runway 13 may also be provided with a controller 113 to control the housing 1 in an improved manner and/or a recharge station 113 to recharge the shuttle 10 and/or the housing 1 at a specific location, such as the display location (D).

Figure 4A:
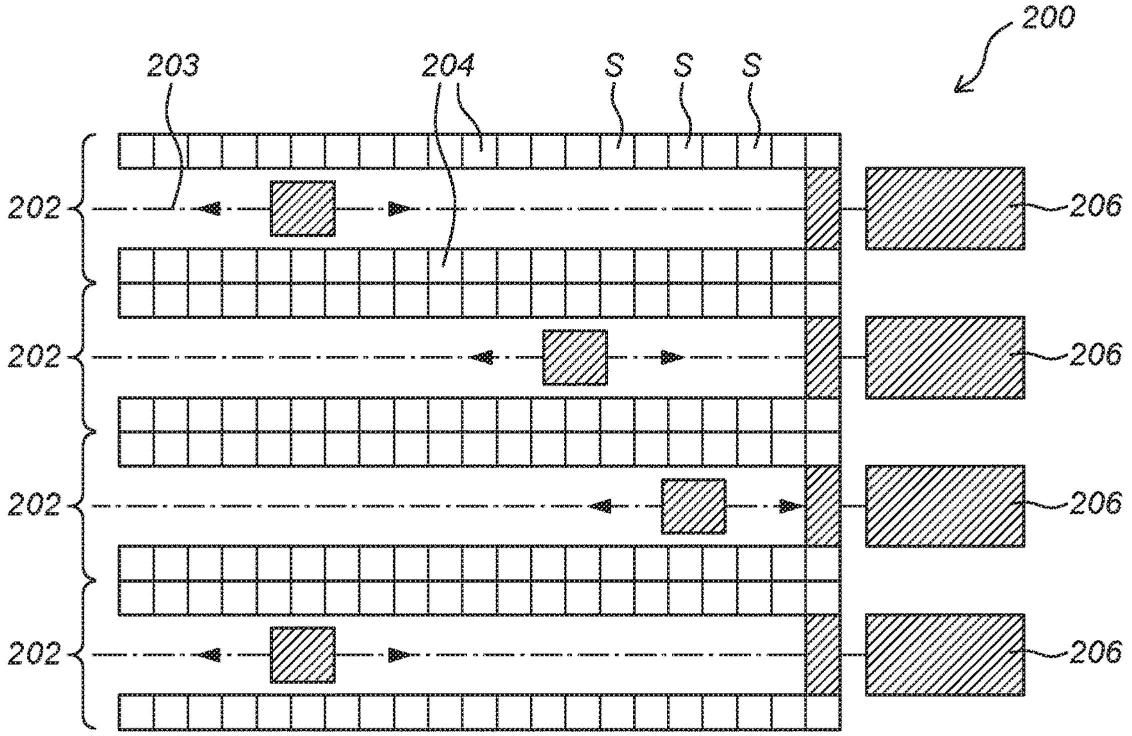
FIGS. 4*a* and 4*b* respectively show diagrammatically a top view and a cross-sectional view of a warehouse for use in a system according to the invention.
Figure 4B:
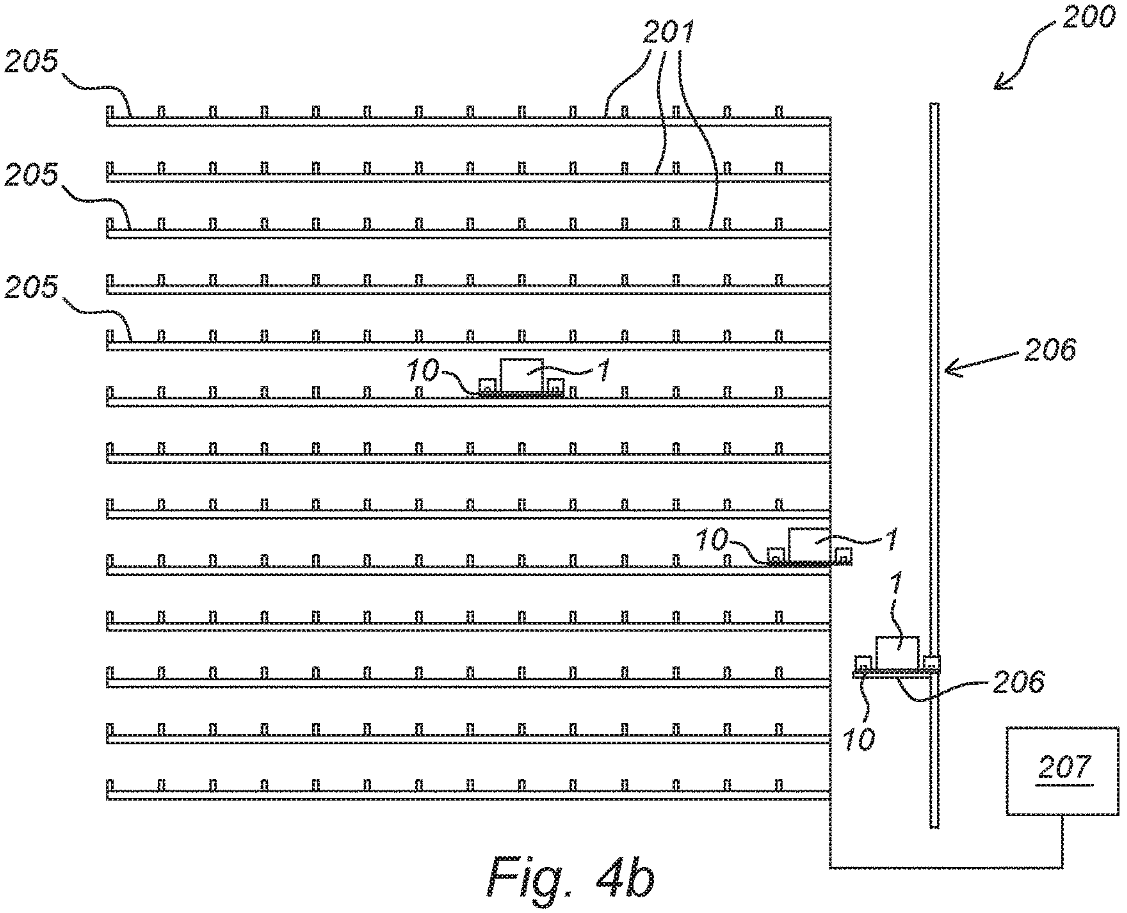

FIGS. 4*a* and 4*b* respectively show diagrammatically a top view and a cross-sectional view of a warehouse 200 for use in a system according to the invention, such as the system 100 as shown in FIG. 3. The warehouse 200 comprises a plurality of storage levels 201 (shown in FIG. 4*b*), positioned on top of each other, wherein each level 201 comprises, in this example, four storage assemblies 202, each comprising one lane 203, two storage cabinets 204 at each side of said lane, wherein each storage cabinet comprises a plurality of storage locations(S). Each lane is provided with a runway 205 which comprises two parallel rails for the movement of a shuttle 10. Each storage assembly 202 is associated to at least one elevator 206, located at one end of the lane 203, to transport a shuttle 10 from one level to another level 201. Optionally, the elevator 206 makes part of a transfer robot, preferably a wheeled robot, of which transfer robot embodiments have been described above. The transfer robot may be used to pick up and release a housing 1 and to place the housing 1 on another location, such as a display location. The elevator 206 which optionally makes part of a transfer robot may be designed as telescopic fork. Preferably, all runways 205 are connected to a common electrical power supply 207, preferably per lane 203. This warehouse structure allows a relatively flexible pick and place of stored housings 1 and to displace a selected housing on-demand to a display location.

Figure 5:
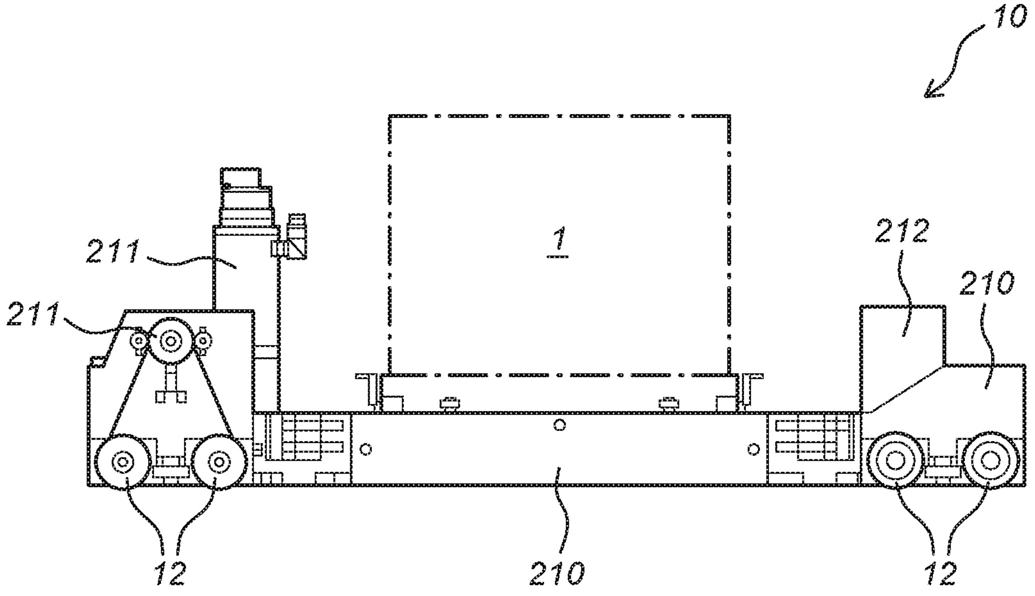
FIG. 5 shows a detailed view of a shuttle for use in a system according to the invention.

FIG. 5 shows a detailed view of the shuttle 10 for use in a system 100 according to the invention, such as the system 100 as shown in FIGS. 2 and 3. The shuttle comprises a chassis 210 onto which wheels 12 are mounted to permit the shuttle 10 to move along a runway 13 (of a warehouse 200). The chassis 210 comprises a tray 11 configured to carry a housing 1. Typically, the chassis accommodates an electromotor 211 powered by a battery of super-capacitors 212 on-board the shuttle conveyor 10. Optionally, the chassis 210 comprises one or more pick and place arm to charge the tray 11 of the shuttle 10 with a housing 1 and to discharge the housing 1 from the tray 11. The tray 11 may be provided with gripping elements 213 to grip, clamp, and/or stabilize a housing 1 mounted by the shuttle 10 during transportation.

The hereby presented invention has been illustrated by several illustrative embodiments. It is noted that any features of the invention described herein are disclosed not only in their explicit combination, but also as a group of features wherein each feature should be construed as disclosed independent from another, and as such is an individual, preferred feature of the invention.

In the present application, the non-limited verb "comprise" and conjugations thereof, is used in a broader sense by which also the limited verb "contain", "substantially consist of", "formed by" are included.

The invention claimed is:

1. A remains remembrance system, comprising:

a mobile housing for accommodating and presenting an urn in which cremated remains are placed, the housing comprising:

a bottom wall onto which said urn may be placed, at least one side wall, wherein said housing allows the urn, once placed onto the bottom wall, to be visible for viewing, at least one digital display attached to the housing for displaying media, at least one digital camera attached to the housing and pointed towards said digital display and at least part of the urn, once placed onto the bottom wall of said housing, a communication unit configured to transmit images recorded by said digital camera, and at least one rechargeable battery for powering said display, said camera, and said communication unit;

at least one media player connected or connectable to said display, at least one user computing device, configured to receive, via the communication unit, images and/or videos recorded by the digital camera, and to display said images and/or videos onto said user computing device, and at least one conveyor device configured to displace the mobile housing between at least one storage location for storing the housing, and at least one display location for exposing the housing to a predefined viewpoint.

2. The system according to claim 1, wherein the at least one side wall of the housing encloses at least one opening, and wherein said at least one digital camera is also pointed towards said opening.

3. The system according to claim 1, wherein the at least one side wall of the housing is at least partially transparent and/or translucent.

4. The system according to claim 1, wherein the at least one side wall of the housing is at least partially composed of transparent electrochromic glass configured for varying its light transmission values throughout its surface area in response to the application of an electric field, and the system further comprises at least one generator for generating an electric field.

5. The system according to claim 1, wherein, in the housing, the camera and the display are situated at opposing sides of the housing.

6. The system according to claim 1, wherein the camera is attached to an upper section of the side wall.

7. The system according to claim 1, wherein the housing comprises at least one connector for electrically connecting the housing to at least one charging station and/or an external controller, and/or wherein the housing comprises at least one internal controller for controlling at least the at least one camera, the at least one display, and the communication unit.

8. The system according to claim 1, wherein the bottom wall of the housing comprises at least one mounting element for mounting the urn.

9. The system according to claim 1, wherein the communication unit comprises at least one antenna, wherein the antenna is a BLUETOOTH® antenna and/or a Wi-Fi® antenna.

10. The system according to claim 1, wherein the predefined viewpoint is formed by a reception area for visiting people, or wherein the predefined viewpoint is formed by a building's window.

11. The system according to claim 1, wherein the at least one conveyor device comprises at least one shuttle and at least one runway for said at least one shuttle, for displacing the housing between a storage location and a display location.

12. The system according to claim 1, further comprising a plurality of housings and a warehouse which comprises at least one storage level for storing said plurality of housings, wherein each storage level comprises at least two storage locations.

13. The system according to claim 1, further comprising at least one recharge location configured to recharge the at least one rechargeable battery of the housing, and wherein the conveyor device is configured to convey each housing to and from said at least one recharge location.

14. The system according to claim 1, wherein at least one media player is installed on a host computing device configured to communicate with the communication unit of the housing and/or wherein at least one media player is provided with a library of pre-installed videos.

15. The system according to claim 1, wherein a control application is installed on or accessible by the at least one user computing device, which control application is configured to communicate, directly or indirectly, with the communication unit of a selective housing, and wherein the control application is configured (i) to allow a user of the at least one user computing device to control at least one media player to display a selective video on the display of said selective housing, and (ii) to display an image and/or video recorded by the at least one digital camera of said selective housing onto a screen of the at least one user computing device.

16. A computer-implemented method for allowing people to remember deceased, comprising the steps of:

A) allowing a user, by using a user computing device to:

i. digitally control a media player of a mobile housing containing an urn, in which cremated remains are placed, to display media onto a digital display of said housing facing said urn, and/or any other, box-like receptacle for a human or animal corpse and to display an image recorded by a digital camera of said housing facing said urn and/or said other receptable and said digital display onto a screen of said user; and ii. digitally control a conveyor device to transport said housing between a storage location and a display location, and to display the image recorded by said digital camera of said housing facing said urn and/or said other receptacle and an opening enclosed by at least one side wall of said housing onto the screen of said user.

17. The method according to claim 16, further comprising step B), which is performed prior to step A), and step B) comprises enrolling and/or authenticating the user and/or the user's user computing device to control at least one selective housing, and in case this enrolment and/or authentication is successful, to grant said user and/or said user computing device a digital right to wirelessly, digitally control said at least one selective housing during step A).

18. The method according to claim 16, further comprising step D), which is performed prior to and/or during step A), and step D) comprises selecting, by said user, and by using the user computing device, at least one image and/or at least one video and to be displayed on the digital display of the housing during step A).

19. The method according to claim 16, wherein, during step A), the camera position is adjusted by the user.

* * * * *